A. C. STEWART.
RECIPROCATING ENGINE.
APPLICATION FILED OCT. 21, 1918.

1,389,017.

Patented Aug. 30, 1921.

INVENTOR.
Alfred C. Stewart
BY Arthur P. Wright
ATTORNEY.

UNITED STATES PATENT OFFICE.

ALFRED C. STEWART, OF LOS ANGELES, CALIFORNIA.

RECIPROCATING ENGINE.

1,389,017. Specification of Letters Patent. Patented Aug. 30, 1921.

Application filed October 21, 1918. Serial No. 258,976.

*To all whom it may concern:*

Be it known that I, ALFRED C. STEWART, a citizen of the United States, residing at Los Angeles, in the county of Los Angeles and State of California, have invented a new and useful Improvement in Reciprocating Engines, of which the following is a specification.

This invention relates to an improvement in reciprocating engines, particularly of the internal combustion type, and the main object of the invention is to provide a reciprocating engine adapted for operation at high speed with a minimum wear and loss of power due to pressure and friction on the bearings. In reciprocating engines there is a reversal of momentum in each stroke by reason of the fact that the piston and other reciprocating parts have to be arrested and the motion therefore reversed at each end of each stroke, this reversal of motion being performed periodically under control of the connections to the rotating shaft operated by the engine. By reason of such connections between the rotating shaft and the reciprocating part, there is applied to the bearings of the shaft during the time of retardation of the reciprocating motion at the end of each stroke a reactive pressure corresponding to the rate of retardation, and at high speed the pressure so applied to the bearings has been found to be a serious drawback, not only in increasing the wear and tear on the bearings, but limiting the practicable speed of the engine and decreasing seriously the efficiency of the engine by reason of the absorption of energy in friction on the bearings and in vibration of the engine parts. This effect has been overcome to some extent by the use of balance weights on the rotating shaft, but it is not practicable to compensate wholly in this manner for the rapid changes of momentum in high speed engines. My invention provides for more effective compensation of the changes of momentum and elimination of pressure on the shaft bearings than is practicable by the use of balance weights alone and has the further advantage that it provides for such compensation and elimination of such excess bearing pressure without unduly increasing the weight of the moving parts of the engine.

The accompanying drawings illustrate embodiments of my invention, and referring thereto:

Figure 1:
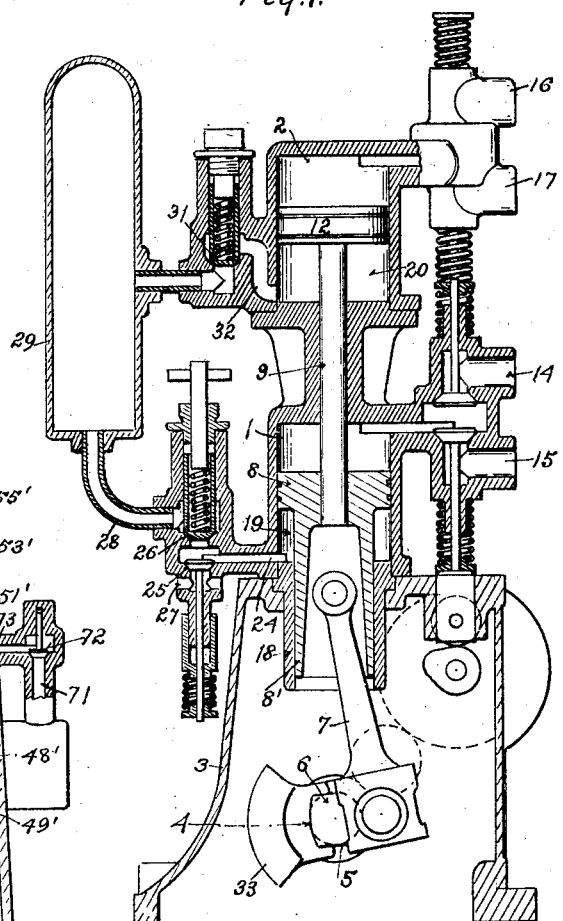
Figure 1 is a vertical section of a vertical internal combustion engine, provided with my invention.

Referring to Fig. 1, the engine therein shown comprises two cylinders, 1 and 2 arranged in tandem above the crank case 3 in which is mounted to rotate on suitable bearings, (one of which is indicated in dotted lines at 4) a shaft 5 having a crank 6 connected by pitman or connecting rod 7 to a trunk piston 8 mounted to slide in the cylinder 1. A piston rod 9 connected to the piston 8 extends through a suitable bearing in the head of the cylinder 1 and is connected at its upper end to a piston 12 sliding in cylinder 2.

It will be understood that the usual packing rings will be provided for pistons 8 and 12 and, if necessary, for the piston rod 9 where it passes through the head of cylinder 1.

Cylinder 1 is provided with the usual intake and exhaust valves indicated at 14 and 15 to control, respectively, the supply of mixture to said cylinders and the exhaust of products of combustion therefrom; similarly, cylinder 2 may be provided with intake and exhaust valves 16 and 17 so that the two cylinders may both operate as internal combustion cylinders, the same being preferably timed 180 degrees apart in their operation with reference to the revolution of the shaft 5 so that said cylinders operate alternately.

To absorb or take up the momentum of the reciprocating pistons and connections thereof in the outward (down) stroke, I provide pneumatic cushioning means, consisting preferably of compression chambers in one or both cylinders 1 and 2 between the respective pistons and the outer head of each cylinder. Thus the cylinder 1 may be provided with an outer head member 18 formed as a sleeve fitting over a reduced piston portion 8′ on piston 8 so as to form a compression chamber 19 between piston 8 and the inner end of said sleeve 18. Suitable packing rings may be provided for this piston extension 8′. Similarly the space between the piston 12 and the header 11 or cylinder 2 constitutes a compression chamber 20. Compression of the air in either or both of these compression chambers would serve to cushion the downward or outward movement of these pistons on account of the compression of the air in such chambers as the respective pistons approach the outer head.

In order, however, to secure a more effective cushioning action, I prefer to utilize one of the compression chambers, for example, the chamber 19, as the means for pumping or compressing the air from the outside into the compression spaces aforesaid and for this purpose the compression chamber 19 is provided with a port 24 communicating with an inwardly opening spring controlled check valve 25 and with an outwardly opening spring controlled check valve 26, valve 25 controlling the passage 27, leading to the outer air and valve 26 controlling a passage 28 leading to a reservoir or tank 29, which is in communication with the compression chamber 20, preferably through a spring controlled check valve 31 opening inwardly with respect to chamber 20, and controlling a passage 32.

In order to provide more or less completely for balancing rotary members on the crank shaft, as distinguished from the reciprocating parts of said engine, said crank shaft may be provided with a balance weight indicated at 33.

In the operation of the engine, the cylinders 1 and 2 operate in the usual manner, in a four stroke cycle, to reciprocate the pistons 8 and 12 and rotate the shaft 5 through the connection thereto by the connecting rod 7 and crank 6. In the inward (or upward) movement of the pistons during the compression stroke, the compression of the mixture in the respective chambers produces a cushioning effect, absorbing the momentum of the reciprocating parts and arresting the upward movement of said parts, the work done in such arrest being stored in the compressed gases and being restored to the thermo-dynamic cycle along with the additional energy developed by the explosion in the next succeeding stroke and, as the two cylinders operate alternately, the above action provides for cushioning in both upward strokes of the four stroke cycle, one cylinder being on compression when the other cylinder is on scavenging stroke, or vice versa. In each upward stroke of piston 8, the air is drawn in through passages 27 and 24, valve 25 opening in this operation and in the next succeeding downward stroke of piston 8, the air so drawn into compression chamber 19 is compressed and part of such air passes through passages 24 and 28 (valve 26 opening under the pressure of such air) to the reservoir 29.

In each upward movement of piston 12, the air is drawn from reservoir 29 through inwardly opening valve 31 to the compression chamber 20 and in each downward movement of the piston 12, the air so drawn in is compressed and serves as a cushion to resist the down or outward movement of the piston, the amount of resistance thus offered being dependent on the amount of air taken into the compression chamber 20, which in turn depends on the pressure in reservoir 29. Such pressure may be determined by suitable adjustment of the spring controlled check valve 26 so that any required pressure may be produced and maintained in the reservoir 29 and the cushioning effect on the piston 12 in conjunction with whatever cushioning effect may be produced by piston 8 working in compression chamber 19 may be made just sufficient, or nearly sufficient, to take up or absorb the momentum of the reciprocating parts in the downward or outward stroke thereof.

By the above described means, the momentum or reciprocating parts, instead of being arrested by direct thrust through the connecting rod, crank and shaft against the shaft bearings is taken up by elastic fluid in the compression chambers 20 and 19 and the shaft bearings are thereby relieved of the thrust, strains and friction that they would otherwise have to sustain. The work or energy stored in the air compressed in the chambers 20 and 19 in this manner is utilized in the next succeeding in or up stroke, the air expanding and doing work on the respective pistons, with the result that with the construction described there is a working force or effective torque on the shaft during each in or up stroke as well as during each out or down stroke. This further contributes to smoothness of running and the elimination of pressure and friction on the bearings as it distributes the working force more effectively between the several strokes of the engine instead of concentrating the force in a single stroke which would require a more intense pressure on the bearings with resulting greater friction. For the same reason, namely, that the described device operates to equalize the working force throughout the different strokes, it is not necessary with such construction to provide for so great a fly wheel effect as would otherwise be required and the fly wheel used may be made correspondingly lighter and smaller.

Figure 2:
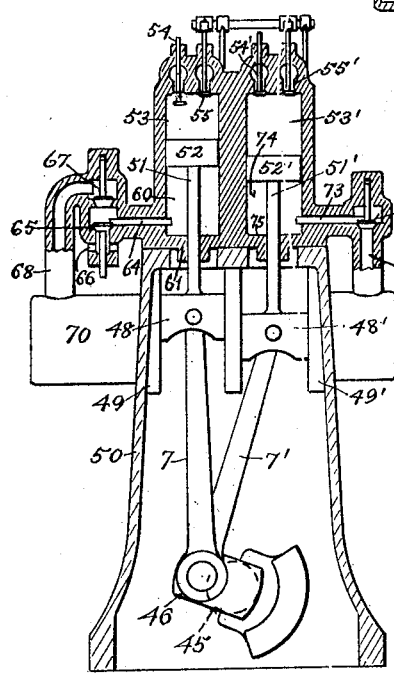
Fig. 2 is a similar section of a modified form of the invention.

Instead of placing the two cylinders in tandem, as shown in Fig. 1, they may be placed side by side, as shown in Fig. 2, wherein the crank 46 on shaft 45 is connected by two connecting rods 7 and 7' to the respective cross-heads 48 and 48' working in guides 49 and 49' mounted on crank case 50. Piston rods 51 and 51' work through the heads of said cylinders and are connected to pistons 52 and 52' working in cylinders 53 and 53'. The respective pistons 52 and 52' and the parts connected therewith reciprocate in substantially the same direction, so that the momentum of these parts, at the latter part of the expansion stroke in each combustion cylinder chamber 53 and 53', will be utilized in compression of air in the compression chambers hereinafter referred to. Said cylinders 53 and 53' are provided with the usual intake and exhaust valves 54, 55, 54' and 55' operated in the usual manner to provide for the operation of the cylinders 53 and 53' in a four stroke cycle, the operation of these cylinders being alternate, as above described.

A pumping compression chamber 60 between the piston 52 in cylinder 53 and the head 61 of said cylinder is provided with a port 64 communicating through a check valve 65 with a passage 66 leading to the upper air and through a check valve 67 with a passage 68 leading to a reservoir 70. From said reservoir 70 a conduit or passage 71 leads through a check valve 72 to a port 73 communicating with a cushioning compression chamber 74 in cylinder 53 between piston 52' and the head 75 of said cylinder.

The operation of this form of the apparatus will be obvious from the above description, the air being compressed in the compression chamber 60 and forced into the reservoir 70 and into compression chamber 74 until sufficient air is accumulated in the compression chambers to provide the requisite cushioning action in each downward or outward stroke.

In each of the forms of the invention above described the respective pistons and parts connected thereto are connected to the same crank, or substantially the same portion of the driven member or shaft of the engine, and operate in substantially the same plane or line of movement, so that a single cushioning chamber is enabled to take up or absorb the momentum of all such parts as well as momentarily store a portion of the energy developed in the expansion stroke; and by reason of the stated construction and arrangements of the parts, the effect described is obtained without requiring transmission of stresses on the shaft, thereby avoiding undue intermittent strains on the shaft and violent intermittent pressures on the bearings such as would result with a construction in which the cushioning piston means and the working pistons are connected to different parts of the engine shaft.

What I claim is:

1. A reciprocating internal combustion engine comprising two combustion cylinder chambers and means for effecting alternate operation thereof on a four stroke cycle, a cushioning chamber and a pumping cylinder chamber, and piston means operating in the respective cylinder chambers aforesaid and operating to compress air in both the pumping and cushioning cylinder chambers during the expansion strokes in the combustion cylinder chambers, said pumping cylinder chamber being connected to said cushioning cylinder chamber to pump air thereinto.

2. A reciprocating internal combustion engine comprising two combustion cylinder chambers and means for effecting alternate operation thereof on a four stroke cycle, a cushioning cylinder chamber, means operated by the engine for supplying to said cushioning cylinder chamber gases at a pressure in excess of atmospheric pressure, pistons operating in the respective combustion cylinder chambers, piston means operating in the cushioning cylinder chamber, and a driven shaft connected to said pistons and piston means, said pistons and piston means being adapted to reciprocate in substantially the same line of movement and being connected to substantially the same portion of said shaft so that the momentum of said pistons and piston means will be taken up at each expansion stroke in each combustion cylinder chamber by compression in said cushioning cylinder chamber without producing strains on said shaft.

3. A reciprocating internal combustion engine comprising a combustion cylinder chamber, a cushioning cylinder chamber, a pumping cylinder chamber, piston means operating in the respective cylinder chambers aforesaid and valve means for controlling the operation of said pumping cylinder chamber to cause compression of air in such pumping cylinder chamber and supply of such compressed air to said cushioning cylinder chamber and a driven shaft having a crank in permanent operating connection with said piston means.

4. A reciprocating internal combustion engine comprising two combustion cylinders arranged in tandem, and means for effecting alternate operation thereof on a four stroke cycle, a cushioning cylinder chamber mounted in axial alinement with said combustion cylinder chambers, means operated by the engine for supplying compressed gas to said cushioning cylinder chamber and provided with a valve tending to move to closed position to retain such compressed gas in said chamber, a driven shaft, a piston rod connected to operate said shaft, and piston means on said rod and operating in the respective combustion cylinder chambers and in the cushioning cylinder chamber.

5. An engine as set forth in claim 4, wherein the said means for supplying compressed gas to the cushioning cylinder chamber consists of a portion of the cylinder and piston used for one of the combustion cylinder chambers, and the cushioning cylinder chamber and piston means therefor consist of a portion of the other combustion cylinder and the piston therefor.

6. A reciprocating internal combustion engine comprising two combustion cylinder chambers and means for effecting alternate operation thereof on a four stroke cycle, a cushioning cylinder chamber, a pumping cylinder chamber, piston means operating in the respective cylinder chambers aforesaid and connected together to compress air in both the pumping and cushioning cylinder chambers during the expansion strokes in the combustion cylinder chambers, a compressed air reservoir having connections to said pumping and cushioning cylinder chambers, and valve means for controlling said connections to cause compression of air into said reservoir by said pumping cylinder chamber, and admission of compressed air from said reservoir into the cushioning cylinder chamber when the pressure in said cushioning cylinder chamber is less than that in the reservoir.

In testimony whereof I have hereunto subscribed my name this 9th day of October 1918.

ALFRED C. STEWART.